Jan. 21, 1936.　　　G. R. UPHAM　　　2,028,423
NONSEPARABLE FASTENER
Filed Dec. 9, 1932
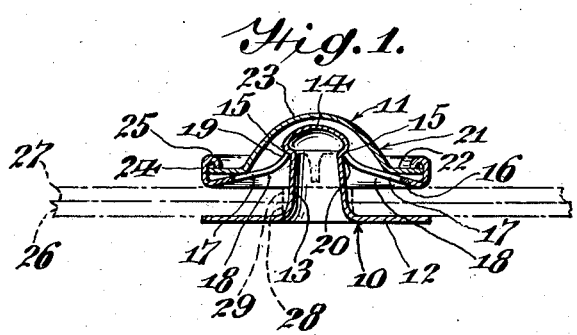
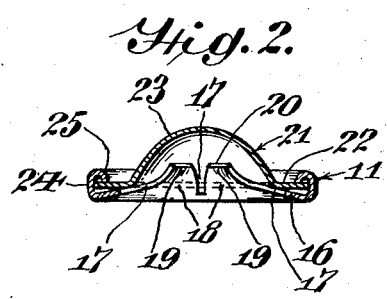
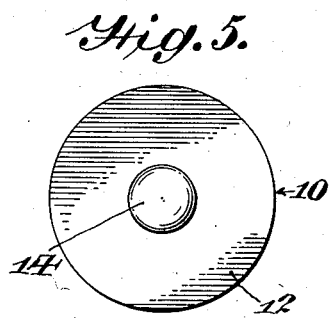
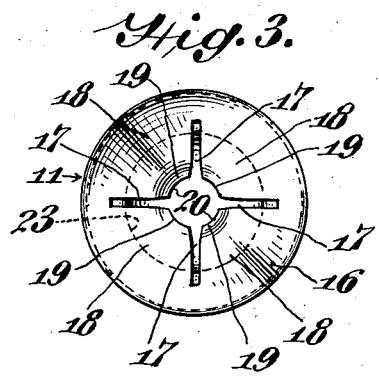
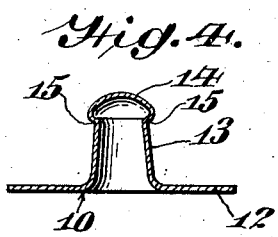
Inventor
Gilbert R. Upham,
By John D. Myers
Attorney Patented Jan. 21, 1936

2,028,423

UNITED STATES PATENT OFFICE 2,028,423

NONSEPARABLE FASTENER

Gilbert R. Upham, Churchville, Pa., assignor to The De Long Hook and Eye Company, a corporation of Pennsylvania Application December 9, 1932, Serial No. 646,473

2 Claims. (Cl. 292—307)

This invention relates to a non-separable fastener and has been designed particularly for the purpose of securing together two or more sheets of paper, fabric or other material in such a manner as to provide a seal to prevent the unauthorized separation of the sheets.

The primary purpose of the invention, therefore, is to provide a non-separable locking or sealing device so constructed that the co-operating parts thereof may be easily and quickly assembled in relation to the sheets of material to be secured together. A further object of the invention is the provision in a locking or sealing device of a structure which, although easily assembled in sealing relation with respect to the sheets of material to be secured together, may not be readily separated without the destruction of the device. A still further object of the invention is the provision in such a device of means whereby the co-operating elements of the device are rendered inaccessible, thus making it difficult to remove the seal from the material secured together thereby without the employment of tools or other means of a character to render the device unfit for further use.

In order that the invention may be clearly understood reference may be made to the accompanying drawing in which:—

Fig. 1 is a transverse sectional view of the device in assembled relation, with the sheets of material secured together thereby shown in dotted lines;

Fig. 2 is a transverse sectional view of the socket portion of the device;

Fig. 3 is a bottom plan view of the socket portion of the device;

Fig. 4 is a transverse sectional view of the post portion of the device; and

Fig. 5 is a top plan view of the post portion of the device.

The improvement comprises two co-operating elements, a post member 10 and a socket member 11. The post member consists of a flat base 12 preferably disc-shaped, and a centrally arranged shank 13 projecting from one side thereof and preferably produced by punching or drawing the central portion of the base 12 outwardly to form a hollow shank with an enlarged head 14 on the outer end thereof. The juncture of the head 14 with the shank portion 13 of the post provides a shoulder 15 for co-operation with the socket member 11 in a manner hereinafter described.

The socket member of the device consists essentially of a dished plate 16 provided with radial slots 17 extending outwardly from the center to points substantially spaced from the outer edge thereof, thus forming a plurality of resilient tongues 18 the inner ends 19 of which are spaced from each other to form an opening 20 the diameter of which is slightly less than the diameter of the shank portion 13 of the post member, but large enough to permit the passage of the head portion 14 of the post member when the tongues 18 are sufficiently flexed. Due to the dished formation of the socket plate 16 the free ends 19 of the resilient tongues 18 incline outwardly from one side of the plate in order to enable the head 14 of the post portion to be easily inserted through the opening formed by the spaced free ends of these tongues, in the direction in which the tongues protrude from the plate. Inasmuch, however, as the opening 20 is of lesser diameter than the shank portion 13 of the post member, the free ends 19 of the tongues 18 engage with the shoulder 15 at the juncture of the head and shank portions of the post member to prevent the removal of the post from the socket when the parts have been assembled in co-operating relation as shown in Fig. 1.

Inasmuch as the resilient tongues 18 of the socket member would be readily accessible when the post and socket are assembled with respect to the sheets of material which are secured together by the device, it is advisable to provide a cover member 21 for the outwardly protruding ends of the resilient tongues. As disclosed herein this cover member is in the form of a flat plate 22 having its central portion pressed outwardly to provide a dome-shaped portion 23 spaced from the free ends of the resilient tongues a sufficient distance to permit the shank of the post member to be inserted through the opening of the socket member such a distance that the free ends of the resilient tongues may engage with the shoulder between the enlarged head and the shank portion. The cover member 21 may be secured in position on the socket plate 16 by turning the outer edge of the socket plate to form a flange 24 which may be reversely bent upon itself as at 25 to engage the edge of the socket plate as is clearly shown in Figs. 1 and 2 of the drawing, although other means may be employed to secure these two elements together if desired.

In using the device herein described, the sheets of material 26, 27 to be secured together are provided with alining perforations 28, 29 of a size to receive the head 14 and shank portion 13 of the post member but preventing the passage of the base portion 12 therethrough. The socket member 11 is then attached to the post portion by applying sufficient pressure to the post and socket portions to force the enlarged head through the opening 20 formed by the spaced inner ends 19 of the resilient tongues 18. These tongues then drop into position against the shoulder 15 at the juncture of the head and shank, and separation of the post and socket members is prevented by reason of the fact that the opening through the socket member is smaller than the diameter of the shank portion of the post member, and the free ends of the resilient tongues engage with the shank of the post and are thus prevented from being bent past the plane of the socket plate to permit withdrawal of the head without rupturing or destroying the device. When it is desired to remove the seal this may be done by separating the post portion from the socket member by means of a suitable tool, and it will be understood that any such separation entails the destruction of the device.

As disclosed herein the shank portion of the post member is formed with an enlarged head to provide the shoulder 15 heretofore described. It will be readily understood, however, that a suitable shoulder may be provided by means of transverse grooves or notches in the wall of the shank portion, it only being necessary that some means be provided on the shank portion for positive engagement with the free ends of the resilient tongues to prevent the withdrawal of the shank. In any case, it is essential that the opening in the socket member be of smaller diameter than the diameter of the shank in order to prevent the free ends of the resilient tongues from being forced beyond the plane of the socket plate in which the resilient tongues are formed.

In manufacturing devices in accordance with the improvement disclosed herein it will usually be found convenient to standardize the socket members of the device and provide post members having shanks of different lengths. By providing post members with shanks of different lengths the device may readily be adapted to securing or sealing together varying thicknesses of material as will be readily understood.

While one form which the invention may take has been disclosed herein, with certain variations thereof, it will be understood that various other changes may be made in the invention without departing from the spirit thereof as it has been described herein, and such changes are intended to be comprehended by the claims appended hereto.

What is desired to secure by United States Letters Patent is:—

1. A socket member for a non-separable fastener comprising a dome-shaped member having a substantially flat marginal portion thereon, a plate dished substantially throughout its extent toward said dome-shaped member and having a transversely bent marginal flange the free edge of which is reversely bent into engagement with said flat marginal portion to secure said plate and said dome-shaped member together, and a plurality of resilient tongues formed on said plate and extending toward the center thereof with the free ends inclined outwardly toward said dome-shaped member and spaced to form a shank receiving opening.

2. A socket member for a non-separable fastener comprising a dome-shaped member having a flat marginal portion, a plate extending across the open end of said dome-shaped member and dished substantially throughout its extent toward said dome-shaped member and having its outer edge rigidly secured to said flat marginal portion, the central portion of said plate being radially slitted to provide a plurality of resilient tongues projecting into said dome-shaped member and inclined toward said dome-shaped member throughout their length and having the inner ends thereof spaced from each other and from said dome-shaped member.

GILBERT R. UPHAM.